United States Patent [19]

Titus

[11] Patent Number: 4,680,038
[45] Date of Patent: Jul. 14, 1987

[54] CYCLONE FILTER WITH ALL METAL FILTERING CANDLE

[76] Inventor: Frank Titus, Am Katzenpfed 4, D-6148 Heppenheim, Fed. Rep. of Germany

[21] Appl. No.: 746,228

[22] Filed: Jun. 18, 1985

[30] Foreign Application Priority Data

Jun. 18, 1984 [DE] Fed. Rep. of Germany ....... 3422592

[51] Int. Cl.⁴ ............................................. B01D 46/04
[52] U.S. Cl. ........................................ 55/302; 55/380; 55/523
[58] Field of Search ................. 55/302, 337, 380, 381, 55/294, 523, 334, 459 R

[56] References Cited

U.S. PATENT DOCUMENTS

| 3,729,903 | 5/1973 | Espeel et al. | 55/302 |
| 3,977,847 | 8/1976 | Clark | 55/302 |
| 4,511,379 | 4/1985 | Hauptmann | 55/238 |

FOREIGN PATENT DOCUMENTS

| 763647 | 8/1971 | Belgium | 55/302 |
| 662337 | 4/1963 | Canada | 55/337 |
| 2133578 | 10/1972 | Fed. Rep. of Germany | 55/302 |
| 2550352 | 5/1976 | Fed. Rep. of Germany | 55/337 |
| 2094635 | 2/1972 | France | 55/302 |
| 489519 | 2/1976 | U.S.S.R. | 55/302 |

*Primary Examiner*—Bernard Nozick
*Attorney, Agent, or Firm*—Robert J. Koch

[57] ABSTRACT

A filtering apparatus for separation of solids from a solid carrying fluid arranged in a housing and having a material flow inlet. The housing is divided into an upper collector chamber and a lower area by an intermediate separating wall. One or more candle filters made up of two concentrically arranged metal fabric filter cylinders defining an annular space therebetween the arranged in a material flow area of the housing and may be surrounded by an immersion tube. A plurality of Laval nozzles are arranged above each candle filter in the collector chamber and are utilized for producing an enhanced injection reverse flushing effect to remove solids adhering to the candle filters. The annular cylindrical configuration of the candle filters greatly enhances the filtering surface area.

2 Claims, 7 Drawing Figures

CYCLONE FILTER WITH ALL METAL FILTERING CANDLE

BACKGROUND OF THE INVENTION

1. Field of The Invention

The invention relates to a newly developed all-metal tandem candle filter arranged for gas/solids separation and liquids/solids separation in an apparatus representing a combination of a cyclone, a filter and a product bunker or of a cyclone and filter only.

2. Description of the Related Art

For the separation of solid particles or suspended particles from gaseous flows heretofore cyclone precipitators were used, which deposit the product precipitated into a bunker located underneath. Final cleansing is effected by a dust filter following the cyclone in line. Both installations precipitate their dust in a common bunker. In order to prevent undercurrents, it has been necessary to equip both installations with failure prone bucket wheels at the product outlet (FIG. 1/1).

FIG. 1 is a schematic representation of an installation for separation of solid particles suspended in a gaseous flow including a first cyclone 10 for precipitation of coarse material and a second cyclone 12 from which a carrier fluid to be cleaned will evade through a dust pocket filter 14 with an outlet 16. Both cyclones 10 and 12 are connected to a common bunker 18 by pipes 20 and independent bucket wheels 22.

It is customary in the case of in-line filters to allow the gas flow in tangentially or directly under the filter zone. The disadvantage here is that the height of the bunker is lost for the inflow and the product fines cleaned on top must drop through a rotating flow, with the result that approximately 50% of the falling dust is again entrained upward, thereby increasing the dust load of the raw gas and reducing the specific filter surface load (FIG. 1/2).

A further disadvantage is the fact that with a rising product column in the bunker the product is again whirled up by the wind hose principle and reenters the filter zone (FIG. 1/3).

SUMMARY OF THE INVENTION

These disadvantages are eliminated by the cyclone-filter combination (FIG. 2) wherein the tangentially placed inlet tube 28 opens into the uppermost part. The pocket or bag filter No. 30, surrounded in keeping with the cyclone principle by an immersion tube 24, is arranged centered or eccentrically. The waste gas freed of dust flows through the clean gas chamber 25 and the fitting 26 from the filter.

DETAILED DESCRIPTION OF THE PREFERRED EMBODIMENT

Mode of Operation of the Cyclone Filter

Figure 2:
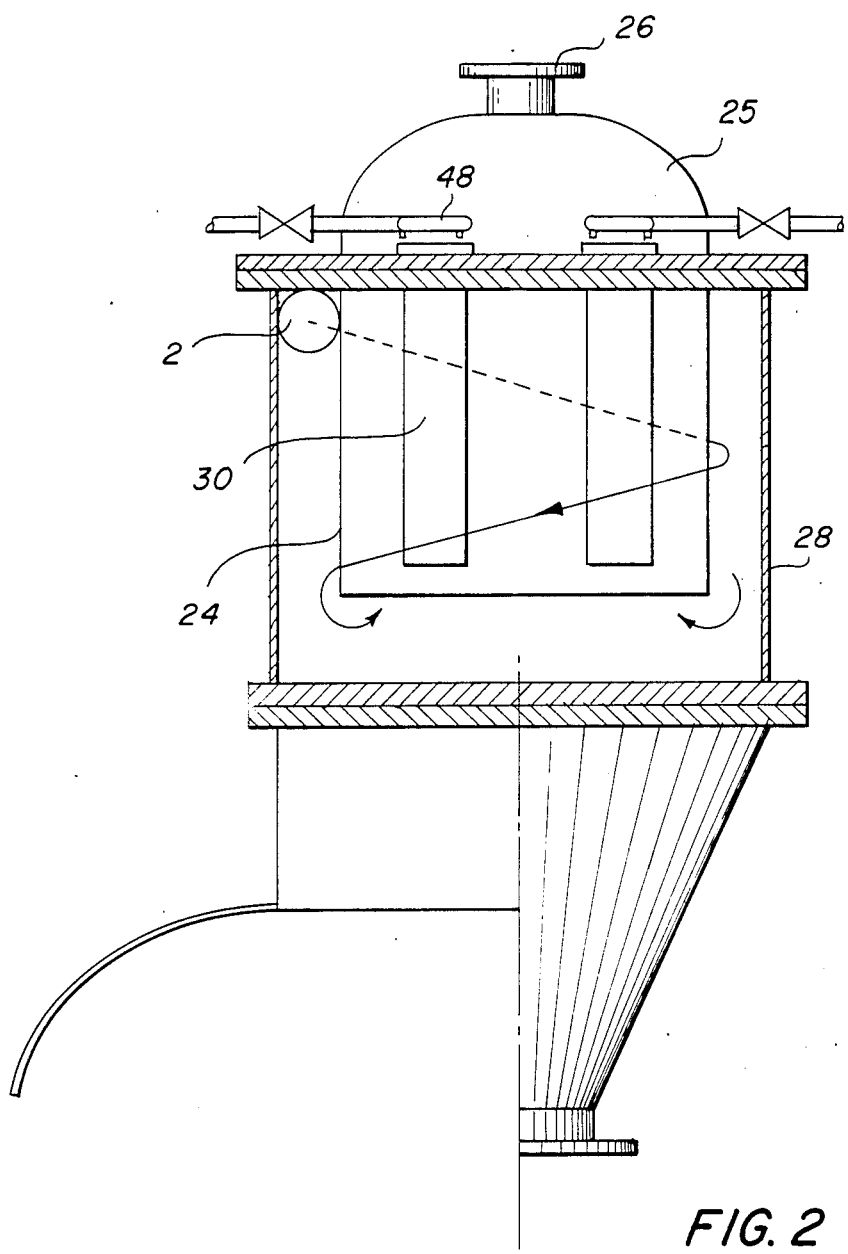
FIG. 2 shows a vertical section of separator.

The mixture of dust and gas enters the cylinder 1 at a high velocity through the tangential inlet fitting (FIG. 2). The gas is forced by the immersion tube 24 surrounding the filter elements to convert its dynamic energy into static energy and to reduce the flow to a minimum. Following the termination of the cyclone-like rotating flow, the quieted gas enters on all sides from below, following a deflection of 180°, the filter zone inside the immersion tube 24. It is thereby prevented, in contrast to the inflow of the gas underneath the filter zone, as is customary in commercially available filters, that the gas is forced to fall through the aforementioned rotating flow and is then again drawn upward by said flow. The dust load of the raw gas in the filter zone is significantly lower as compared to conventional filters and the cyclone-like precipitation is less. This lesser precipitation yields only advantages for filtration, as not only fine dusts are arriving in the filter zone, but also a solid solution which renders a significantly higher filter surface load and a substantially improved reverse cleaning possible. A desirable accompanying feature is the elimination of the aforementioned bucket wheels in a divided configuration and the space-saving layout and low structural height of this combined configuration.

FIG. 2 shows a schematic vertical section of a separator installation according to the invention showing tangential entry 2 for the loaded gas flow, its rotational flow path around immersion tube 24 inside of which two "filtering candles" 30 are visible. Their outlets for filtering gas lead into dome 25 which has a common outlet 26. The entry 2 and tube 24 are mounted on a cylindrical housing 28 with upper and lower flanges for a connection to a bunker or vessel.

The filter materials used consists both in the case of the bag and the pocket filters for solids/gas separation mainly of textiles, such as needled polyester felt, polypropylene, cotton or teflon-coated fabrics.

Reverse cleaning is effected by means of a blow of compressed gas through a Laval nozzle, which cleans the fine dust deposits from the filter fabric not only by agitating the filter materials but also by blowing from inside out.

However, reverse cleaning has not been able to prevent the settling of fine dust particles in the fabric and the increase in the pressure differential by factors of two or three compared to new filter materials, before the pressure difference became constant.

A further substantial disadvantage is the static charging of the textiles, which not only constitutes a hazard in the case of solvent containing products or those endangered by dust explosion, but also transmits a charge to an appreciable degree to the products, which then can be cleansed with the utmost difficulty only from the filter materials and which often form bridges between filter elements.

In view of the tightening of purity specifications for pharmaceutical products, such as sterile injection goods or end products low in foreign particles (Japan quality), it was no longer possible to attain the number of foreign particles restricted to a minimum. As the result of the fulling and reversing cleaning of the filters and the mechanical loading by crystals, abrasion occurs which far exceeds the number of foreign particles permitted.

In order to be able to continue, the "old German" layout of a cyclone and separate filters was again used.

The goods precipitated in the cyclone good could be utilized as finished merchandise, while the products precipitated in the textile filter required further processing. In view of the very high unit prices of pharmaceutical end products, a loss incurred by the reprocessing of products precipitated in textile filters is particularly expensive and cost intensive.

As mono-products are being displaced increasingly by high quality, frequently changing products, it has become necessary upon each change of products to dismantle the textile filters and to reassemble them following the cleaning of the internal spaces. If the filter operates in the vacuum range, the effort becomes particularly odious in view of the numerous screws involved.

As a consequence of the above-described disadvantages it was necessary to undertake developments leading away from textile to all-metal filters.

Figure 1:
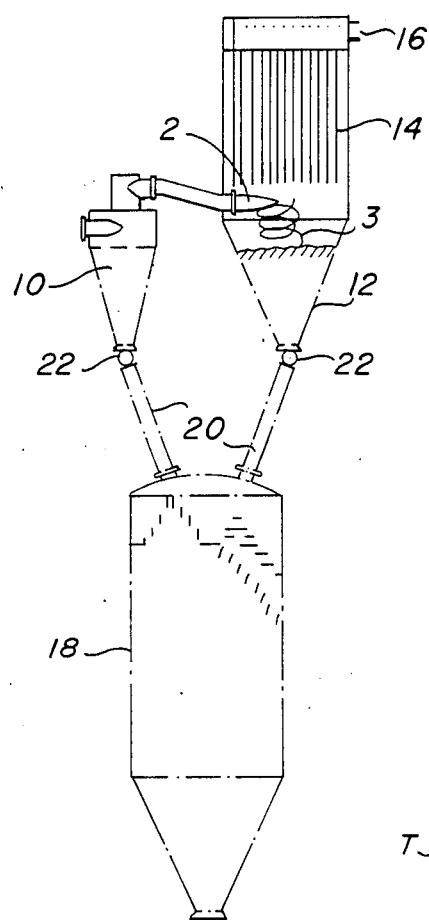
FIG. 1 shows an installation for separation of solid particles.
Figure 3:
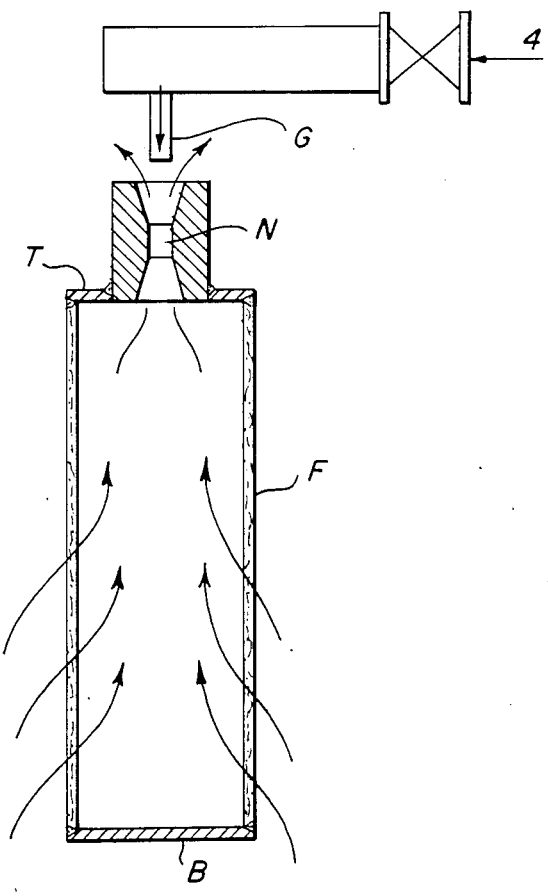
FIG. 3 shows a sectional view of filtering candle including a cylindrical metal filter.

Experiments with commercial metal candle filters according to FIG. 3 yielded degrees of precipitation at least as good or better than textile filters, but the specific filter area load was increased negligibly only, approximately to 3 $m^3/m^2 \times min$ (textile filters approximately 2 $m^3/m^2 \times min$).

FIG. 3 shows a sectional view of a typical filtering candle including a cylindrical metal filter F with a closed bottom B and top T. The top exhibits a Laval-nozzle serving as an outlet for filtering gas as an inlet for reverse cleaning gas for cleaning the filter and recovering powder and particles sticking to the filter surface.

The cause of this slight increase is not the filter material 1 (FIG. 3) but the Laval nozzle 2 required for reverse cleaning. The reverse cleaning gas is blown through a gas pipe 4 by means of a jet pipe 3 for cleaning through the Laval nozzle 2, as the metal filter material cannot be fulled and can only be flushed in reverse by the air entrained. The Laval nozzle 2 is usually ½ to 1" in diameter, thereby limiting the volume of gas blown out at a maximum velocity of 20 m/s, the surface area of the filter and thus the specific filter area load. In the case of higher gas volumes, such as those following a convection dryer, an infinite number of candle filters is required in view of the filter surface area limited by the Laval nozzle. This leads to configurations that are usually 7–10 times more expensive than conventional textile filters. Even though metal fabrics, as described above, offer enormous advantages specifically in the pharmaceutical field, they cannot be utilized in this form for reasons of cost.

The core of the invention therefore consists of the development of a candle filter, the dimensions of which, both with respect to surface area and specific filter surface area loads, are not limited by the Laval nozzle 2 (FIG. 3), but in actuality only by the velocity of the flow against the filter fabric, the difference in pressure between the raw gas and clean gas sides and the specific filter surface loads.

Figure 4:
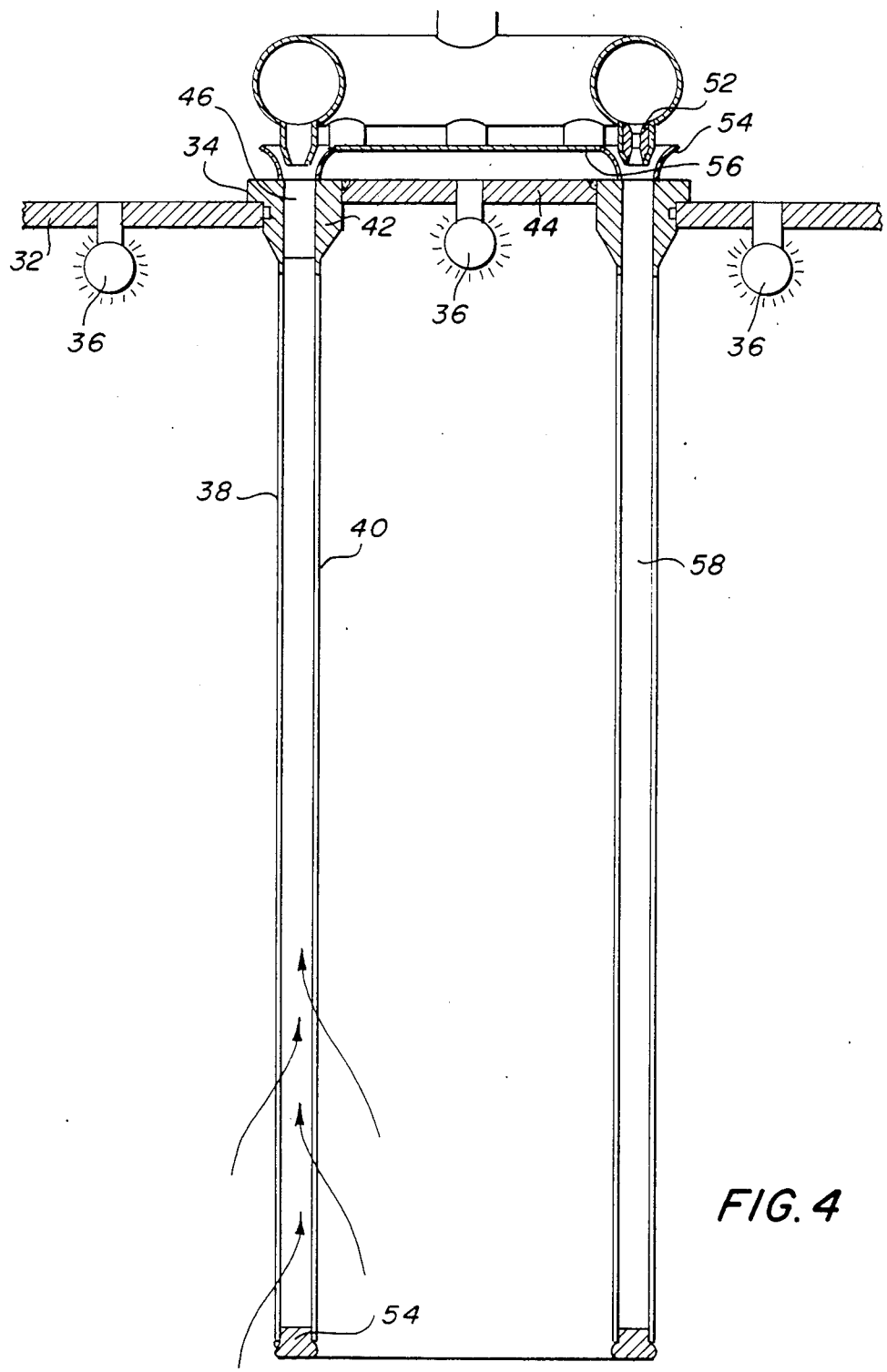
FIG. 4 shows a large section through a filtering candle.

FIG. 4 shows a tandem candle consisting of two concentric filter cylinders. The gas to be purified is able to flow into the annular gap both from the inside and the outside and exits as clean gas through the Laval nozzle 1.

FIG. 4 shows a larger scale vertical section through a filtering candle according to the invention for use in the location of filter 30 shown in FIG. 2. The horizontal mounting plate 32 is comparable to the bottom plate of dome 25 of FIG. 2 and secured to the upper flange of housing 28.

FIG. 4 shows two concentric cylindrical metal filter elements 38, 40 closed by common bottom spacer ring 54 and welded to upper ring members 34, 42 (44). The outlet of the annular space 58 is a ring-shaped nozzle 46 formed by a flaring inner member 56 and outer ring member 54. A reverse cleaning fluid line 48 having a plurality of downwardly directed Laval nozzles 50 coacting with the upper flaring nozzle area 46 leads into annular space 58.

A filter surface area larger by for example a factor of 5 with respect to a single candle, results in a cross section increased by a factor of 20 in the Laval nozzle. The specific filter surface load in $m^3/m_2 \times min$ may thus be 4 times as high as in the case of a single candle, with the same loss of pressure. In relation to the textile fabric, the specific filter surface load increases by a factor of 10. In view of the significantly smaller filter surface area required, the cost of the filter with tandem candles is reduced to the extent that it represents a type of competition for textile filters that is easily calculated. In view of the fact that all of the disadvantages of textile filters are eliminated, it is especially remarkable that, in case of a product change, it is not necessary to replace the metal filters, as they may be flushed, sprayed, steamed or washed with circulating liquids, since fine particles cannot settle in metal filters as they do in textile filters.

Reverse cleaning is effected by means of an annular line into which a plurality of Laval nozzles, for example 6 or 8, are welded vertically, said nozzles in turn injecting the cleaning blow of the compressed gas into the annular Laval nozzle, thereby removing dust deposits from the tandem candle in counter flow.

In order to improve the efficiency of the injector effect during the blowing of the compressed gas through the Laval jet 46, the further Laval nozzle 50 was designed, said nozzle producing a supersonic flow and increasing the injector effect, i.e., the entrainment of the atmospheric air in the Laval jet 46.

The tandem candle may be operated both with an outer cylinder or an inner cylinder only; but it is more economical to use an inner and an outer cylinder made of a metal filter fabric sintered together for mechanical strength of different layers, even though a woven material is involved (FIGS. 4/4 and 5).

In order to prevent contamination during product changes, additional spray heads 36 may be arranged, which both between the candle filters and within the candle filter product residues can be washed under high pressure spray.

The material used are governed by the requirements of the application.

Figure 5:
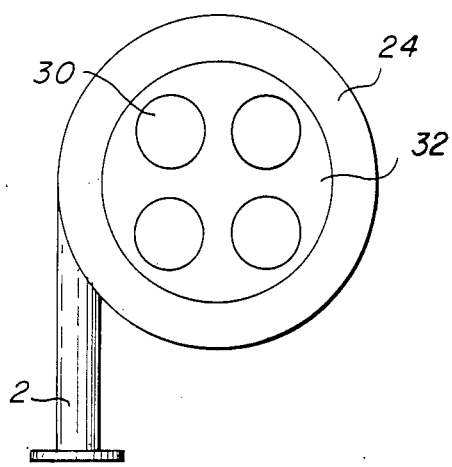
FIGS. 5, 6 and 7 show schematic views from above an installation similar to that represented in FIG. 2 for different forms of the immersion tube and numbers and disposals of filtering candles.

FIG. 5 shows the concentric layout of the cylinders 28 and 24, the tangential inlet and the candle filters 30.

Figure 6:
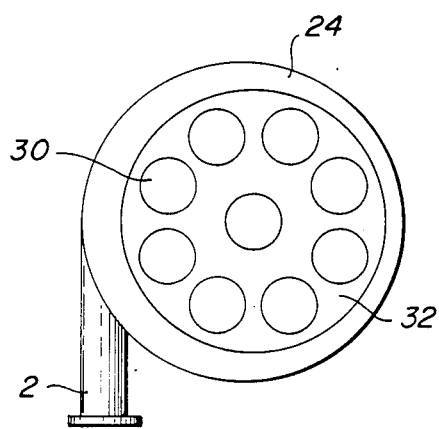

FIG. 6 shows an eccentric layout between cylinder 28 and cylinder 24, with the distance between the cylinders 28 and 24 at the tangential inlet 2 corresponding appropriately to D, while the opposite distance may be significantly smaller than D. Essentially, this yields advantages by reducing the dynamic energy and space requirements.

The number of candle filters 30 will be significantly less in view of the volume of raw gas to be cleaned and the substantially greater specific filter surface load, than with fabric filters or single metal candles. The structural size of the filter is thus substantially reduce both in diameter and, if necessary, in height, thereby also reducing the size of the waste gas cleansing mechanism, including the gas valves.

Figure 7:
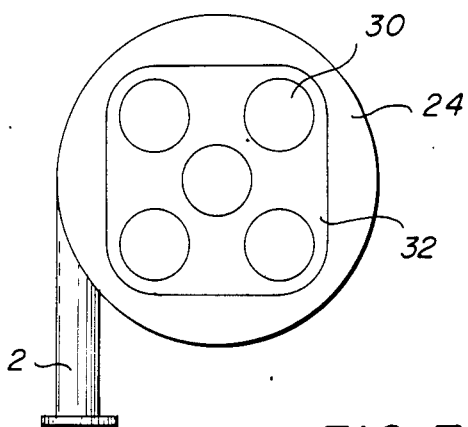

FIG. 7 shows the immersion tube 24 in a rectangular form, whereby as the result of distance between the immersion tube 24 and the cylinder 28, which changes four times, the difference flow desired for the drying effect between the product crystal and the flow of gas is produced in a particularly effective manner.

I claim:

1. A filtering apparatus for separation of solids from a solid carrying fluid comprising:

a housing connected to means for admitting a fluid flow;

an upper collector chamber for cleansed fluid defined by an intermediate separating wall of said housing, said upper collector chamber exhibiting an outlet;

at least one candle filter mounted within said housing comprising two concentrically arranged, metal fabric filter cylinders;

an annular space between said filter cylinders;

means for closing said annular space at a lower extension of said filter cylinders;

an annular duct connected at an upper extension of said filter cylinders, leading through said intermediate separating wall and providing open communication between said annular space and said upper collector chamber;

a plurality of cleaning nozzle means for producing an injection reverse flushing effect to remove solids adhering to said filter cylinders, disposed above and directed into said annular duct; and a plurality of wash nozzle means, disposed in an area enclosed by said candle filter and externally to said candle filters, for effecting a superficial cleaning of said filter cylinders in case of a product change in order to prevent contamination, without a need of dismantling or replacing said candle filter.

2. A filter apparatus according to claim 1, wherein said filter cylinders exhibit a circular cross-section.

* * * * *